United States Patent [19]

Terry

[11] Patent Number: 5,011,351

[45] Date of Patent: Apr. 30, 1991

[54] WEDGE LOCK DIE WASHER

[76] Inventor: Sydney L. Terry, 47 Pine Ct., Grosse Point Farms, Mich. 48236

[21] Appl. No.: 495,618

[22] Filed: Mar. 19, 1990

[51] Int. Cl.⁵ .................... F16B 39/24; F16B 39/282
[52] U.S. Cl. .................................. 411/144; 411/156;
411/161; 411/957; 29/525.1
[58] Field of Search ............... 411/149, 150, 155, 156,
411/160–162, 957, 144; 29/525.1

[56] References Cited

U.S. PATENT DOCUMENTS

| | | |
|---|---|---|
| 299,987 | 6/1884 | Jordan . |
| 355,646 | 1/1887 | Gates . |
| 570,354 | 10/1896 | Turner . |
| 697,394 | 4/1902 | Benson . |
| 779,751 | 1/1905 | Waitt .................................. 411/957 |
| 2,271,732 | 2/1942 | Chappuis . |
| 2,278,062 | 3/1942 | Koharovich . |
| 2,675,844 | 4/1954 | Knohl . |
| 2,794,476 | 6/1957 | Hanneman .......................... 411/155 |
| 3,077,218 | 2/1963 | Ziegler . |
| 3,181,584 | 5/1965 | Borowsky . |
| 3,194,292 | 7/1965 | Borowsky . |
| 3,221,792 | 12/1965 | Poupitch . |
| 3,332,464 | 7/1967 | Castel . |
| 3,417,802 | 12/1968 | Oldenkott . |
| 4,103,725 | 8/1978 | Abe . |
| 4,708,555 | 11/1987 | Terry .................................. 411/149 |
| 4,793,752 | 12/1988 | Frieberg ............................. 411/161 |
| 4,808,050 | 2/1989 | Landt ................................. 411/188 |

Primary Examiner—Neill R. Wilson
Attorney, Agent, or Firm—Krass & Young

[57] ABSTRACT

A lock washer, a locking fastener assembly, and a method of providing a secure, inexpensive fastener joint. The lock washer has a convexly conical upper surface including circumferentially spaced cam surfaces separated by radial shoulders and a concavely conical undersurface. The washer is hardened relative to the associated nut so that as the washer and a nut are tightened together the upper face of the washer acts as a die which presses into the underface of the nut to form a mirror mating image of the conical upper surface of the washer on the underface of the nut. The fully torqued nut and washer define coacting ramp surfaces on the underface of the nut and the upper face of the washer which act upon any tendency of the nut to move in a loosening direction to increase the overall height of the nut and the washer so as to further tighten the joint. The washer is hardened to ensure that the surface of the washer cuts as a die into the lower surface of the nut. In the invention methodology the nut and washer are tightened together into a fully torqued position utilizing a common tool to engage the wrenching flats of the nut and washer and press the upper face of the washer into the lower face of the nut, whereafter the washer is held stationary and the nut is backed off a slight amount to remove residual torque in the bolt while increasing the axial loading.

21 Claims, 3 Drawing Sheets

WEDGE LOCK DIE WASHER

BACKGROUND OF THE INVENTION

This invention relates to locking of threaded fasteners which are used in a joint assembly to preclude loosening of the nut or bolt under vibratory loading.

Locking fasteners intended to preclude loosening or backing off of nuts or bolts under vibratory loading have been available for many years and have taken various and diverse forms. However, the commercial acceptance of the prior art locking fasteners has been severely limited by their complexity, by their relatively high expense, by their ineffectiveness in precluding loosening of the fastener under high frequency vibratory loading, by the difficult procedures required to utilize the locking fastener, and/or by their limiting the clamping tension force that can be achieved.

SUMMARY OF THE INVENTION

This invention is directed to the provision of an improved locking fastener.

More specifically this invention is directed to the provision of a locking fastener which is extremely simply in design and yet extremely effective in precluding loosening of the associated nut or bolt.

Yet more specifically, this invention is directed to the provision of a locking fastener, including a method of fastening, that allows the achievement of an extremely high clamping force.

The present invention discloses an improved lock washer, an improved fastener assembly, and an improved method of providing a secure fastener joint.

The invention locking fastener comprises a annular washer member having flat wrenching sides at its outer periphery, having a convexly conical upper annular face within its outer periphery, and having a plurality of circumferentially spaced teeth means on its upper conical surface. This simple lock washer construction allows the lock washer to be utilized with a standard bolt or nut wherein the wrenching flats on the nut/bolt and on the lock washer may be simultaneously engaged to allow the teeth means on the upper face of the lock washer to be embedded in the confronting lower annular face of the nut/bolt head as the bolt/nut is tightened.

According to a further feature of the invention, the teeth means comprise circumferentially spaced cam surfaces on the upper face of the lock washer separated from each other by radially extending shoulders. This arrangement allows the upper face of the lock washer to be configured with a pitch angle at least equal to the pitch angle of the associated threaded fastener and with a hand corresponding to the hand of the associated threaded fastener so that any attempt on the part of the nut or bolt head to move in a loosening direction with respect to the washer following the tightening operation is resisted by movement of the ram surfaces embedded in the nut/bolt head upwardly along the cam surfaces on the upper face of the washer.

According to a further feature of the invention, the annular underface of the washer is concave. This arrangement has the effect of moving the center of pressure as between the washer and the seat against which the washer is pressed radially outwardly so as to require a greater torque to move the washer relative to the seat than to move the nut or bolt head relative to the washer.

According to a further feature of the invention, a locking fastener assembly is provided including a first threaded fastener (such as standard nut or bolt) including an annular portion having flat wrenching sides and presenting a lower annular face formed of a relatively soft material and a second annular fastener having flat wrenching sides and presenting an upper annular convexly conical surface formed of a relatively hard material. This first and second fastener combination allows the relatively hard upper surface of the second fastener member to be embedded in the relatively soft lower annular surface of the first fastener member as the two members are turned together utilizing their flat wrenching sides. The upper annular surface on the second fastener member is provided with a series of circumferentially spaced cam surfaces separated from each other by radially extending shoulders so that mating mirror image cam surfaces are formed on the underface of the first fastener member as the two members are tightened together.

The invention methodology includes the steps of forming a lock washer having a relatively hard upper surface; forming a threaded fastener member including an annular portion having a relatively soft lower surface; placing the lock washer upper surface proximate the annular portion lower surface; turning the lock washer and threaded fastener together in a first direction while engaging the threaded fastener member with a threaded member so that the washer and threaded fastener member advance axially along the axis of the threaded member in a tightening direction to bring the lower annular face of the washer against a fixed seat; continuing to rotate the lock washer and threaded fastener together along the threaded member axis to embed the hard upper surface of the washer in the soft lower surface of the annular portion of the threaded fastener member so that the upper face of the washer acts as a die that cuts and presses its shape into the lower face of the annular portion; and shaping the upper surface of the washer such that coacting ramp surfaces are created on the upper and lower annular surfaces of the washer and the annular portion respectively that act upon turning of the annular portion in an opposite loosening direction with the washer held against rotation to move the ramp surfaces on the annular portion upwardly along the ramp surfaces on the washer to increase the total axial height of the washer and annular portion. This methodology allows a relatively hard lock washer to be utilized in combination with a standard nut or bolt to provide a locking assembly that is extremely resistant to loosening movement of the nut or bolt.

According to a further feature of the invention methodology, wrenching flats are provided on the washer and on the annular portion of the fastener member so that the washer and fastener member may be turned together in a tightening direction, utilizing a single wrench, to embed the hard upper surface of the washer into the soft undersurface of the fastener.

According to a further feature of the invention methodology, the upper surface of the washer is shaped to provide a series of circumferentially spaced cam surfaces on the upper surface of the washer separated from each other by radially extending shoulders. This methodology facilitates the provision of coacting ramps on the upper surface of the washer and the undersurface of the nut or bolt head.

According to a further feature of the invention methodology, the upper surface of the washer has a convexly conical configuration to facilitate the embedding of the upper surface of the lock washer into the undersurface of the nut or bolt head and to concentrate the pressure loading between the fastener and the washer at a location proximate the inner diameters of both members.

According to a further feature of the invention methodology, the lower surface of the washer is provided with a concavely conical configuration so as to move the center of pressure as between the washer and the seat radially outwardly so as to require more torque to move the washer relative to seat than to move the nut or bolt head relative to the washer.

According to a further feature of the invention methodology, the cam surfaces on the upper face of the washer have a pitch at least as great as the pitch of the associated threaded fastener and have the same hand as the threads of the associated threaded fastener. This arrangement ensures that the nut or bolt head, as it attempts to move in a loosening direction, will at least maintain the tension in the bolt.

According to a further feature of the invention methodology, the nut or bolt head is backed off a slight amount relative to the lock washer following embedding of the upper surface of the lock washer into the lower surface of the nut or bolt head. This step has the effect of removing torsion in the associated threaded shank and maintaining or increasing the axial loading in the threaded shank. This step has the effect of removing torsion in the associated threaded shank and increasing the axial loading in the threaded shank and permits a higher clamping force to be achieved than would otherwise possible within the physical properties of a given nut or bolt.

DETAILED DESCRIPTION OF THE PREFERRED EMBODIMENTS

Figure 1:
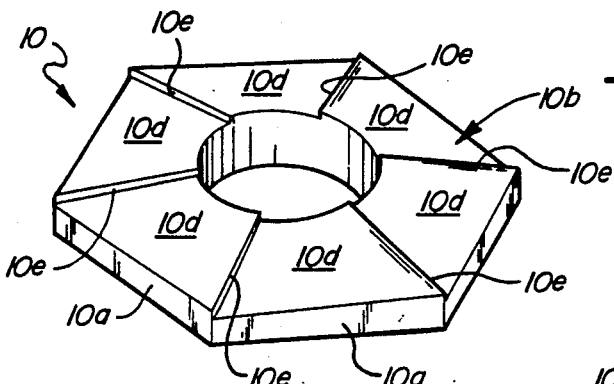
FIG. 1 is a perspective view of a lock washer according to the invention.
Figure 2:
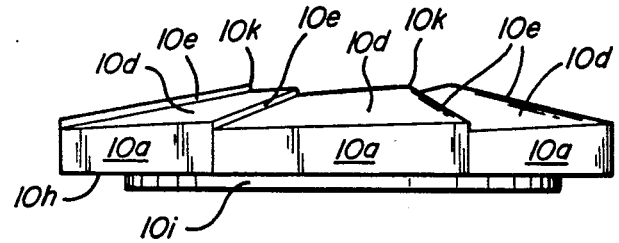
FIG. 2 is a side elevational view of the invention lock washer.
Figure 3:
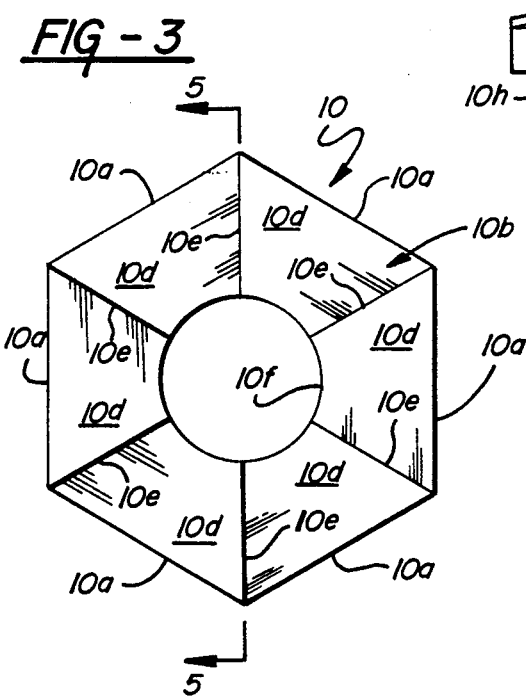
FIG. 3 is a top plan view of the invention lock washer.
Figure 4:
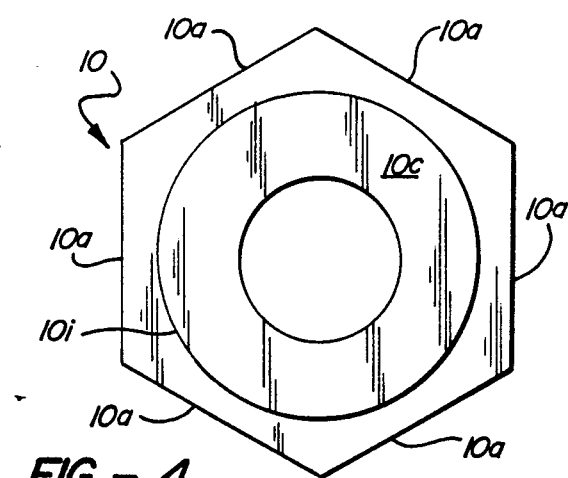
FIG. 4 is a bottom view of the invention lock washer.
Figure 5:
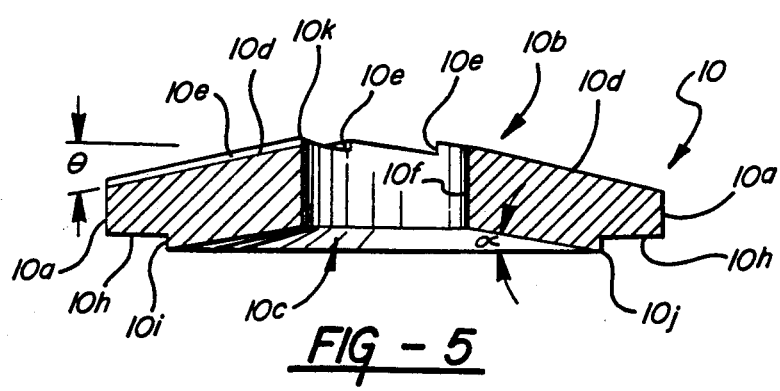
FIG. 5 is a cross-sectional view taken on line 5—5 of FIG. 3.

The lock washer 10 of the invention is hardened to the point that the contour of its upper face is pressed, in mirror image fashion, into the lower surface of a standard nut, or into the hex head of a standard bolt, as the nut or bolt is tightened downwardly onto the washer to press the washer against a seat. Lock washer 10 may be hardened by either cyaniding the surface of a steel washer or by carburizing and hardening. More specifically, the washer 10 may be formed to have a predominantly nitride exterior surface configuration merging into and backed up by a carbide case. More specifically, the washer may include a relatively resilient central core, a transition zone of higher carbon content, and a hard exterior nitride layer. If desired, and after being heat treated, the washer may be plated with a suitable hard metal such as nickel, cadmium, or the like depending on the environment in which it is to be used.

Washer 10 has a generally annular hexagonal configuration and includes evenly spaced wrenching flats 10a on the outer periphery of the washer, a convexly conical upper surface 10b, and a concavely conical lower surface 10c. More specifically, the upper conical face 10b of the washer may be disposed at an angle $\theta$ of 10 degrees with respect to the horizontal and includes a plurality of flat cam surfaces 10d each separated from the next adjacent cam surface by a radially extending shoulder or ledge 10e. Cam surfaces 10d preferably coincide in number with wrenching flats 10a and are preferably arranged so that each cam surface is co-extensive with a respective wrenching flat so that the respective shoulders 10e terminate at the outer periphery of the washer at the juncture of a pair of adjacent wrenching flats.

For a washer having a diameter as measured between opposed wrenching flats of one inch, shoulder 10e may have a height of 0.021 inches with the height being uniform from the inner diameter of the shoulder to the outer diameter of the shoulder where it intersects the respective wrenching flat. Each cam surface 10d therefore embodies a height increase, as measured between one shoulder 10e and the next shoulder 10e, of 0.021 inches with the cam surface, along any radial line on the cam surface, displaying a flat conical configuration. In the preferred construction, each cam surface 10d is co-extensive with a wrenching flat 10a and each cam surface has an angular extent of 60 degrees so that there are 60 degrees between adjacent shoulders 10e.

For a washer having a diameter measured between the flats of one inch, the hole or aperture 10f in the center of the washer may have a diameter of 0.400 inches.

The lower face of the lock washer is relieved at 10h to define an annular vertical wall 10i that is inset with respect to the outer periphery of the washer and the distance between relieved annular face 10h and the lower side of the lock washer may, for example, be 0.02 inches. The concavely conical lower surface 10c extends between annular wall 10i and counterbore 10g and may for example form an angle $\alpha$ of 5 degrees with respect to the horizontal.

Figure 6:
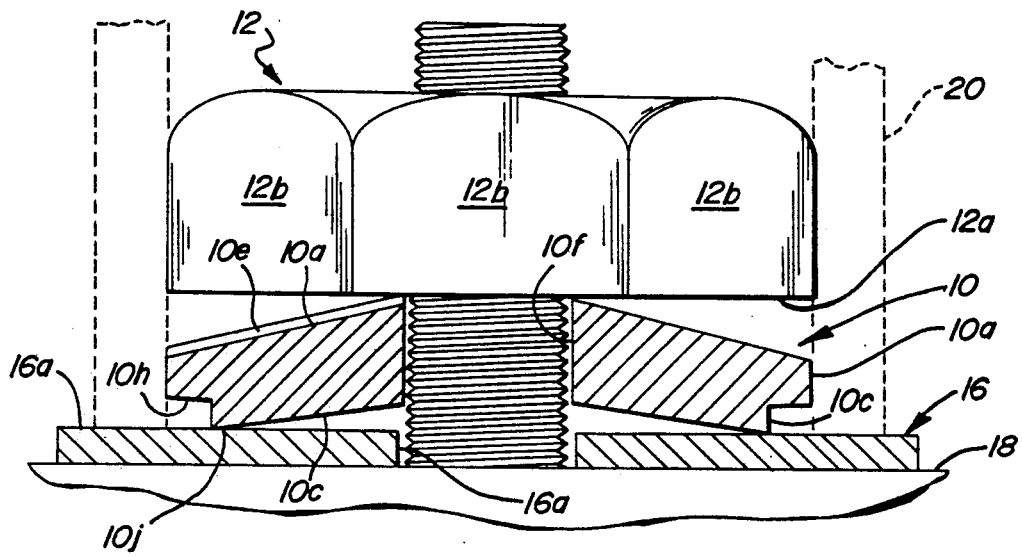
FIG. 6 is a view of the invention lock washer in combination with a nut with the nut and lock washer both received over a stud bolt.
Figure 7:
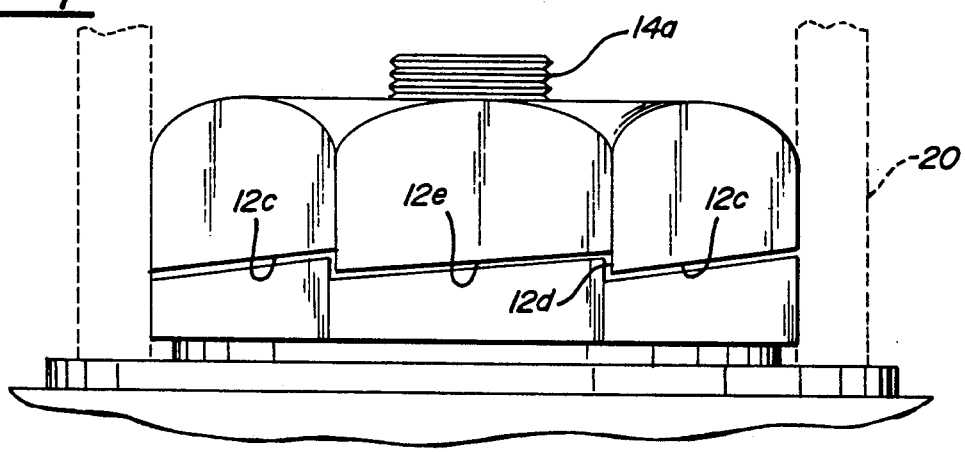
FIG. 7 is a view similar to FIG. 6 but showing the nut and lock washer in a locking relative disposition.
Figure 8:
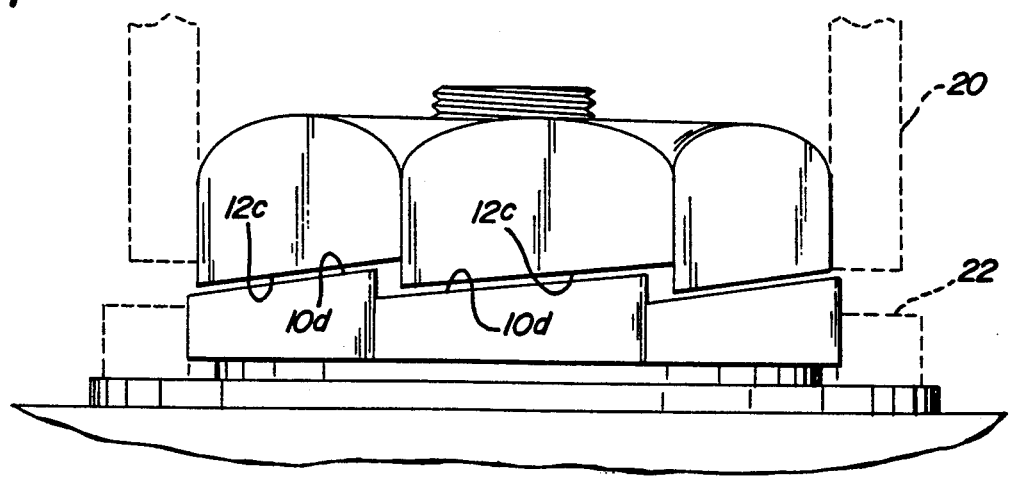
FIG. 8 is a view similar to FIG. 7 but showing the nut backed off a slight amount with respect to the lock washer.

The invention lock washer is seen in FIG. 6-8 in association with a hexagonal nut 12 of standard form with both the washer and nut associated with a stud bolt 14 projecting upwardly through an aperture 16a in a member 16 so as to facilitate the securement of the member 16 to the member 18 from which the stud bolt is rigidly upstanding.

As shown, the washer 10 is placed over the bolt 14 with its lower concavely conical surface 10c disposed in confronting relation to the upper face 16a of member 16 with the actual contact between the washer and member occurring as a circular line contact at the annular edge 10j formed at the intersection of annular shoulder 10i and conical surface 10c. As nut 12, which is formed of a softer metallic material than washer 10, is threaded downwardly on bolt 14, the initial contact between the soft annular undersurface 12a of the bolt and the washer occurs as contact with the circumferentially spaced points 10k formed by shoulders 10e at their intersection with bore 10f. Since nut 12 has hexagonal flats 12b corresponding in number and annular extent to the flats 10a on washer 10, the nut and washer may be turned together by the use of a suitable socket type tool 20 having an interior hexagonal configuration conforming to the exterior hexagonal configuration of the nut and washer so that the tool 20 may be passed over the nut and the washer to engage the respective flats of the nut and washer so that turning movement of the tool 20 has the effect of turning the nut and washer together.

As the nut and washer are thus turned together following initial contact of the lower face of the washer with the seat 16a, and with the upper face of the washer in contact with the lower face of the nut, it will be seen that further joint rotation of the nut and washer has the effect of embedding the upper convexly conical face of the washer into the lower annular face of the nut to produce a mating mirror image of the upper surface 10b of the washer on the lower annular surface 12a of the nut.

The washer thus in effect serves as a die that cuts and presses its shape into the lower face of the nut as the nut and washer are tightened so that, as best seen in FIG. 7, following the tightening process a series of cam faces 12c are formed in circumferentially spaced relation around annular surface 12a with each cam surface 12c formed as a partial mirror image of a corresponding washer surface 10d and with each cam surface 12c separated from the next adjacent cam surface 12c by a radial shoulder 12d formed as a mirror image of the radial shoulder 10e on the upper face of the washer. It will be seen that the hand of the cam surfaces 10d corresponds to the hand of the threads 14a of the bolt; that is, if the bolt threads 14a are, as is traditional, formed as a right hand thread the surfaces 10d are also formed as a right hand helix and thus the surfaces 12c, formed on the lower face of the nut by the surfaces 10d, are also formed as a right hand helix. The pitch angle of the cam surfaces 10c is preferably greater than the pitch angle of the bolt threads. For example, since a typical bolt has a thread pitch angle of approximately 3 degrees, the pitch angle of the cam surfaces 10c may be 6 degrees.

Following tightening of the nut and washer downwardly onto the seat 16a to an extent such that the upper face 10c of the washer is cut and pressed into the lower annular face of the nut, it is preferable that the nut be backed off a slight amount relative to the washer. This backing off movement, which may be as little as 1 degree but may be much greater for some applications, has been found to have the desirable effect of significantly removing the residual twist or torque created in the bolt during the tightening operation. This backing off of the nut may be achieved, as seen in FIG. 8, by raising the tool 20 to a point where it only engages the outer periphery of the nut while simultaneously engaging the outer periphery of the washer with another tool 22 so as to maintain the washer stationary on the seat 16a during the backing off movement of the nut. This backing off movement of the nut, in addition to relieving the residual twist or torque in the bolt, also has the effect of increasing the axial tension loading in the bolt since the cam surfaces 12c on the underface of the nut ride up the cam surfaces 10d on the upper face of the washer to increase the combined height of the washer and nut and thereby, since the pitch angle of the cam surfaces 10c exceeds the pitch angle of the bolt threads, stretch the bolt to increase the axial loading in the bolt and increase the forces tending to preclude further loosening of the nut.

The backing off operation of the nut with the washer held stationary has the further significant advantage of embedding the concave bottom surface of the hard washer into the seat 16a, thereby further ensuring that the washer does not rotate with respect to the seat as a result of vibratory loading in service.

Whether or not the nut is backed off a small amount following the tightening operation, it will be seen that the invention nut and lock washer assembly is extremely resistant to loosening of the nut following the tightening operation since such loosening involves riding of the cam surfaces 12c on the nut upwardly along the cam surfaces 10d on the washer which has the effect of tightening the assembly and discouraging any further loosening.

The concave lower configuration of the nut acts to ensure that any loosening movement as between the member 16, the washer 10, and the nut 12 will occur as movement between the lower face of the nut and the upper face of the washer. Specifically, since the concave surface 10c creates an annular line contact as between the washer and the seat 16a proximate the outer diameter of the washer, and since the contact between the washer and the underface of the nut is concentrated adjacent the inner diameter of the washer, the moment arm resisting movement of the washer on the seat 16a is substantially greater than the moment arm resisting movement of the nut on the washer so that the torque required to break the washer loose from the seat 16a substantially exceeds the torque required to break the nut loose from the upper face of the washer with the result that any tendency for the nut, washer, and seat 16a to undergo relative movement will be acted out as backing off movement of the nut relative to the washer which backing off movement, as previously discussed, has the effect of causing ramps 12c to ride up ramps 10d and further tighten the joint. When it is desired to remove the nut and washer from the bolt 14 so as to allow removal and replacement of part 16, tool 20 is engaged over both the nut and the washer and moved in a loosening direction so as to move the nut and washer simultaneously upwardly and threadably off of the bolt.

As the nut 12 is tightened downwardly onto the washer 10 to squeeze the washer between the nut and the seat 16a, some flattening of the washer will occur. Whereas flattening of the washer will have the effect of adding a spring force to provide further tightening for the joint, the spring effect of the washer is not essential to the operation of the invention and the washer is intended to be as rigid as possible.

The convexly conical shape of the upper face of the washer is important because it provides a concentrated point load and impression at the inside diameter of the nut to begin with and then contact gradually progresses outwardly on the nut seat as the washer digs into and deforms the undersurface of the nut to its contour. Whereas 10 degrees is the specified cone angle for the conical upper face of the washer, the cone angle may be more or less than 10 degrees without departing from the invention concept. An additional advantage of the convexly conical upper face of the washer is that it helps deflect the load carrying teeth closest to the seat away from the bolt which has the effect of improving the load distribution among the threads. The convex shape of the washer causes short teeth to be formed at the inner diameter of the nut as the nut is tightened which serves to help drive the washer forward with the nut as the nut is tightened. The teeth will then grow longer and deeper as the nut is tightened and more and more of the conical cam face first contacts and then forms the seat of the nut. The end result of fully tightening the nut and the washer together is a nut seat most of which is permanently deformed and some of which is elastically deformed up to its yield point. This has the effect of a very stiff spring which works mainly in the axial direction of the bolt but also works to move the nut in a loosening direction with respect to the washer. Since the washer is conical, the inner portion of the nut will be permanently deformed and the mating ramp thus formed will cause the nut to move up the ramp when the tightening torque on the nut is relaxed and thereby increase the clamp force instead of decreasing it. Thus some of the "lash-back" or "spring-back" that occurs when the torquing force is removed from the nut will be converted from torsion in the bolt to tension in the bolt. As indicated, the rest of the loosening twist or torsion normally trapped in the bolt by the friction forces can be removed after full torque has been reached by holding the washer stationary while backing off the nut. The nut only has to move through a very small angle with respect to the washer to effectively remove the residual twist or torque from the bolt and the torque relief will occur almost instantaneously when the nut moves in a loosening direction. This can normally be accomplished simply by pulling the socket upwardly out of engagement with the flats of the washer and carefully applying the loosening torque only to the nut.

The mating cam surfaces on the nut and washer cause the tension in the bolt, and the break away torque, to increase as the nut is moved, either deliberately or under vibration, in a loosening direction through a small angle with respect to the washer.

The nut 12 may be formed with standard grade 8 nut material. The washer, as indicated, may be formed of relatively high carbon steel followed by cyaniding or other heat treatment to achieve a very hard surface relative to the very soft surface of the nut so as to facilitate the cutting and pressing action of the washer with respect to the lower face of the nut. The core of the washer must be formulated such as not to yield under the high compressive stresses generated during the tightening process.

Figure 9:
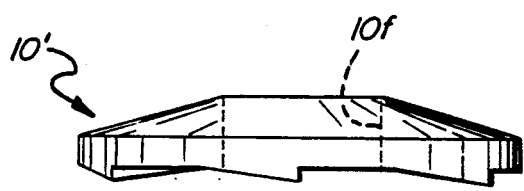
FIGS. 9 and 10 are cross-sectional and bottom views, respectively, of a modified form of invention lock washer.
Figure 10:
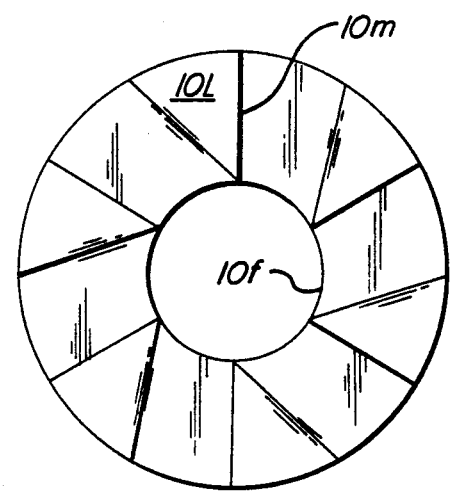

Because of the desirability of embedding the concave undersurface of the washer into the seat during the backing off operation, it may be desirable in some applications to incorporate radial teeth or reverse ratchet teeth in the concave lower face of the washer. These teeth would be forced into the seat during the backing off operation while the washer is held stationary, thereby further ensuring against any rotation of the washer with respect to the seat in service. Such a construction is seen in the lock washer 10' of the FIGS. 9 and 10 embodiment. The embodiment of FIGS. 9 and 10 is identical to the embodiment of FIGS. 1–8 with the exception that the concave undersurface of the washer is provided with a series of flat cam surfaces 101 separated from the next adjacent cam surface by a radially extending shoulder or ledge 10m. As seen, the shoulders 10m gradually diminish in height and fade away completely at the I.D. of the washer as well as circumferentially along the outer diameter of the washer to provide a pie shaped tooth with a single high point of first contact at the O.D. for each tooth. Cam surfaces 101 are reversed with respect to the cam surfaces provided on the upper face of the washer so as to provide a reverse ratcheting effect and cause the undersurface of the washer to dig into the seat 16a in a manner to lockingly engage the soft material of the seat 16a and preclude backing off movement of the washer relative to the seat 16a.

Figure 11:
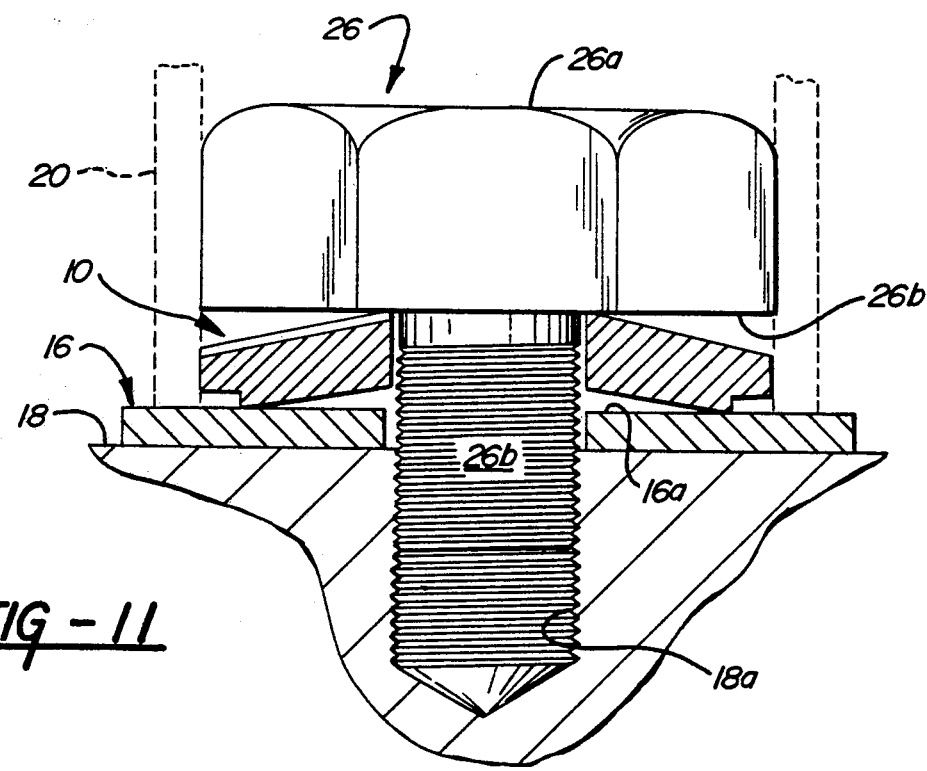
FIG. 11 is a view showing the application of an invention lock washer in combination with a hex headed bolt.

The invention is seen in FIG. 11 as applied to a bolt 26 having a hex head 26a and a threaded shank 26b received in a blind tapped bore 18a in the member 18 so as to facilitate the securement of the member 16 to the upper face of the member 18 by the use of the bolt 26 in cooperation with the invention washer 10.

Specifically, the socket wrench 20 simultaneously engages the flats of the bolt head and the flats of the washer so that the bolt and washer may be moved together downwardly with respect to the seat 16a as the threaded shank 26b advances into the tapped bore 18a. As described with respect to the nut embodiment of FIGS. 1–8, the upper convexly conical surface of the washer 10 is pressed into the softer undersurface 26b of the bolt head as the bolt and washer are rotated together following engagement of the underface of the washer with the seat 16a so that a series of cam surfaces, constituting a mirror image of the cam surfaces 10d on the upper conical face of the washer, are die cut into the lower face of the bolt with the result that, following the tightening operation, any tendency of the bolt to loosen under vibratory conditions will result in the cam surfaces formed on the annular undersurface 26b of the bolt head riding up on the cam surfaces 10d of the washer to tighten the joint and preclude any further loosening of the bolt. As with the FIG. 1–8 and FIGS. 9,10 embodiments, the concavely conical lower configuration of the washer acts to ensure that vibration induced relative movement as between bolt head 26a, washer 10 and seat 16a occurs as movement between bolt head 26a and washer 10 since the moment arm, or center of pressure, of the contact force between the washer and the seat substantially exceeds the moment arm, or center of pressure, of the contact force between the washer and the bolt head.

Further, as described with respect to the FIGS. 1–8 embodiment, it is desirable to back off the bolt slightly following the full torquing operation so as to move the ramps on the underface of the bolt head upwardly along the ramps on the upper face of the washer to relieve the residual twist or torsion in the bolt and increase the tension loading in the bolt. This may be accomplished by moving the socket tool 20 upwardly so that it engages only the flats on the bolt head, engaging the flats on the washer with another tool 22 to hold the washer fixed, and then backing off the bolt a very slight amount (for example 3 degree) with respect to the stationary washer.

Figure 12:
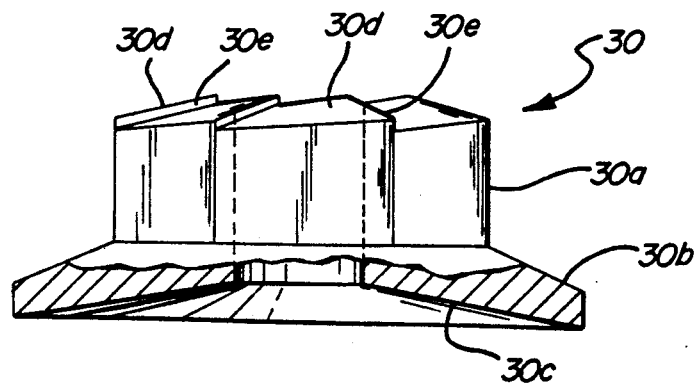
FIG. 12 is a fragmentary side elevational view of a further modified form of invention lock washer.

The invention lock washer 30 seen in the embodiment of FIG. 12 is similar to a standard flanged hex head nut, but without the internal threads, and includes a hex portion 30a defining the wrenching flats and a conical flange portion 30b of circular profile. The lower face of conical flange portion 30b includes a conical recess as seen at 30c and the upper face of the hex portion 30a is configured to provide cam surfaces 30d and radially extending shoulders 30e corresponding to the cam surfaces 10d and shoulders 10e of the FIGS. 1–8 embodiment. The embodiment of FIG. 12 has the advantage providing a larger contact diameter on the lower face of the washer in order to provide a larger seat contact diameter so as to discourage rotation of the washer relative to the seat as compared to rotation of the associated nut relative to the washer. The FIG. 12 embodiment has the further advantage of providing a larger bulk for the washer and thereby greater washer strength so as to better withstand the extremely high loading encountered in a typical service application.

Whereas preferred embodiments of the invention have been illustrated and described in detail it will be apparent that various changes may be made in the disclosed embodiments without departing from the spirit or scope of the invention.

I claim:

1. A locking fastener comprising an annular washer member having flat wrenching sides at an outer periphery thereof, having a convexly conical upper annular face within said outer periphery, having a plurality of circumferentially spaced teeth means on its upper conical surface, and defining a circular seating surface on its lower annular surface.

2. A locking fastener according to claim 1 wherein the teeth means comprise circumferentially spaced cam surfaces separated from each other by radially extending shoulders.

3. A locking fastener according to claim 1 wherein the lower annular face of said washer member is concave.

4. A locking fastener assembly comprising:
a first threaded fastener including an annular portion having flat wrenching sides and presenting a lower annular surface formed of a relatively soft material; and
a second annular fastener having flat wrenching sides, and having an upper annular convexly conical surface provided with circumferentially spaced teeth means formed of a material that is significantly harder than the material of said lower annular surface of said first threaded fastener so that the hard upper surface of the second fastener may act as a die that presses its shape into the soft lower annular surface of the first fastener as the fasteners are rotated together in a threading, tightening operation.

5. An assembly according to claim 4 wherein said teeth means comprise cam surfaces spaced circumferentially around said annular surface separated from each other by radially extending shoulders.

6. An assembly according to claim 5 wherein said first fastener is a nut.

7. An assembly according to claim 5 wherein said first fastener is a bolt having a head constituting said annular portion thereof.

8. A locking fastener comprising an annular washer member having flat wrenching sides and a convexly conical upper annular face with circumferentially spaced cam surfaces formed on said conical upper face separated from each other by radially extending shoulders.

9. A locking fastener according to claim 8 wherein the lower annular face of said washer member is concave.

10. A locking fastener comprising an annular washer member having flat wrenching sides at an outer periphery thereof, having a convexly conical upper annular face within said outer periphery, and having a plurality of circumferentially spaced cam surfaces on its upper conical face separated from each other by radially extending shoulders with the number of cam surfaces equally the number of wrenching flats and each cam surface being circumferentially coextensive with a respective wrenching flat.

11. A locking fastener comprising an annular washer member including an upper polygonal portion, defining flat wrenching sides at its outer periphery and having a convexly conical upper annular face within said outer periphery defining a plurality of circumferentially spaced teeth means, and a lower circular flange portion having a diameter exceeding the diameter of said polygonal portion.

12. A locking fastener according to claim 11 wherein the lower annular face of said washer member, as defined by lower annular face of said circular flange portion, is concave.

13. A method of providing a secure, inexpensive fastener joint comprising the steps of:
forming a lock washer having a relatively hard upper surface;
forming a threaded fastener member including an annular portion having a lower surface that is softer than the upper surface of said washer;
providing wrenching flats on said washer and on said annular portion of said threaded fastener member;
placing said hard lock washer upper surface proximate said annular portion soft lower surface;
turning said lock washer and threaded fastener together in a first direction while engaging said threaded fastener member with a threaded part so that said washer and threaded fastener member advance axially along the axis of the threaded part in a tightening direction to bring the lower annular face of said washer against a seat;
continuing to rotate said lock washer and said threaded fastener together in said first direction along said threaded part axis to embed the hard upper surface of said washer in said soft lower surface of said annular portion of said threaded fastener member so that said upper face of said washer acts as a die that cuts and presses its shape into the lower face of said annular portion; and
shaping said upper surface on said washer such that coacting ramp surfaces are created on said upper and lower annular surfaces of said washer and said annular portion respectively that act upon turning of said annular portion in an opposite loosening direction with the washer held against rotation to move the ramp surfaces on said annular portion upwardly along the ramp surfaces of said washer to increase the total axial height of said washer and said annular portion.

14. A method of providing a secure and inexpensive fastener joint comprising the steps of:
forming a lock washer having a relatively hard upper surface shaped to provide a series of circumferentially spaced cam surfaces separated from each other by radially extending shoulders;
forming a nut including an annular portion having a lower surface that is softer than the upper surface of said washer, said nut having threads having a lead no greater than the lead of said cam surfaces and having the same hand as the cam surface;
placing said hard lock washer upper surface proximate said annular portion soft lower surface;

turning said lock washer and nut together in a first direction while engaging said nut with a bolt so that said washer and nut advance axially along the axis of the bolt in a tightening direction to bring the lower annular face of said washer against a seat; and continuing to rotate said lock washer and said nut together in said first direction along said bolt axis to embed the hard upper surface of said washer in the soft lower surface of said annular portion of said nut so that said upper face of said washer acts as a die that cuts and presses its shape into the lower face of said annular portion;

whereby coacting ramp surfaces are created on said upper and lower annular surfaces of said washer and said annular portion of said nut respectively that act upon turning of said nut in an opposite loosening direction with the washer held against rotation to move the ramp surfaces on said annular portion upwardly along the ramp surfaces of said washer to increase the total axial height of said washer and said annular portion.

15. A method according to claim 14 wherein said cam surfaces have a lead greater than the lead of the threads of the nut.

16. A method of providing a secure, inexpensive fastener joint comprising the steps of:

forming a lock washer having a relatively hard upper surface;

forming a threaded fastener member including an annular portion having a lower surface that is softer than the upper surface of said washer;

placing said hard lock washer upper surface proximate said annular portion soft lower surface;

turning said lock washer and threaded fastener together in a first direction while engaging said threaded fastener member with a threaded part so that said washer and threaded fastener member advance axially along the axis of the threaded part in a tightening direction to bring the lower annular face of said washer against a seat;

continuing to rotate said lock washer and said threaded fastener together in said first direction along said threaded part axis to embed the hard upper surface of said washer in said soft lower surface of said annular portion of said threaded fastener member so that said upper face of said washer acts as a die that cuts and presses its shape into the lower face of said annular portion; and shaping said upper surface on said washer such that coacting ramp surfaces are created on said upper and lower annular surfaces of said washer and said annular portion respectively that act upon turning of said annular portion in an opposite loosening direction with the washer held against rotation to move the ramp surfaces on said annular portion upwardly along the ramp surfaces of said washer to increase the total axial height of said washer and said annular portion.

17. A method according to claim 16 wherein said threaded fastener member is a nut and said threaded part is a bolt.

18. A method according to claim 16 wherein said threaded fastener member is a bolt whose head constitutes said annular portion and whose threaded shank engages the threaded part.

19. A method according to claim 16 wherein the upper face of said washer is shaped to provide a series of circumferentially spaced cam surfaces separated from each other by radially extending shoulders.

20. A method according to claim 16 wherein said upper surface of said washer comprises a convexly conical surface.

21. A method according to claim 20 including the further step of forming the lower surface of said washer as a concavely conical surface.

* * * * *